United States Patent
Wallgren et al.

(10) Patent No.: US 10,947,696 B2
(45) Date of Patent: Mar. 16, 2021

(54) INGRESS/EGRESS ARRANGEMENT FOR MACHINE

(71) Applicant: Caterpillar Inc., Deerfield, IL (US)

(72) Inventors: Jon P. Wallgren, Washington, IL (US); David R. Campbell, East Peoria, IL (US); Andrew J. Gates, Edwards, IL (US); Eric M. Prater, Washington, IL (US); Teddy E. Kingham, Metamora, IL (US); Alexander C. Striegel, Clayton, NC (US)

(73) Assignee: Caterpillar Inc., Peoria, IL (US)

( * ) Notice: Subject to any disclaimer, the term of this patent is extended or adjusted under 35 U.S.C. 154(b) by 77 days.

(21) Appl. No.: 16/458,828

(22) Filed: Jul. 1, 2019

(65) Prior Publication Data

US 2021/0002858 A1    Jan. 7, 2021

(51) Int. Cl.
*E02F 9/08* (2006.01)
*B60R 3/00* (2006.01)
*E02F 9/16* (2006.01)

(52) U.S. Cl.
CPC ............ *E02F 9/0833* (2013.01); *B60R 3/007* (2013.01); *E02F 9/16* (2013.01); *B60Y 2200/411* (2013.01)

(58) Field of Classification Search
CPC ........... E02F 9/0833; E02F 9/16; E02F 9/163; B60R 3/007; B60R 3/02; B60R 3/005; B60Y 2200/411; B60Y 2200/41; B60Y 2200/412; B60Y 2200/413
USPC ........................................................ 280/166
See application file for complete search history.

(56) References Cited

U.S. PATENT DOCUMENTS

| 4,416,486 A * | 11/1983 | McNaught | B62D 33/0617 180/89.12 |
|---|---|---|---|
| 6,068,277 A | 5/2000 | Magnussen | |
| 8,851,555 B2 * | 10/2014 | Gielda | E02F 9/163 296/190.01 |
| 2009/0065301 A1 * | 3/2009 | Ellement | E06C 7/181 182/127 |
| 2014/0353083 A1 * | 12/2014 | Samuel | B60R 3/005 182/87 |
| 2015/0259877 A1 | 9/2015 | Nishikawa et al. | |

(Continued)

FOREIGN PATENT DOCUMENTS

| JP | 2007162358 | 6/2007 |
| JP | 4515367 | 5/2010 |
| JP | 2018127777 | 8/2018 |

*Primary Examiner* — John D Walters
(74) *Attorney, Agent, or Firm* — Oblon, McClelland, Maier & Neustadt

(57) ABSTRACT

An ingress/egress arrangement for a machine comprises an operator cabin and a walkway system outside the operator cabin. The operator cabin can include a plurality of posts, including first post and a second post, and a door rotatably coupled to the first post so as to be movable between at a fully open position and at a fully closed position. An opening in the operator cabin between the first post and the second post defines a first operator ingress/egress point. The walkway system provides operator access to inside the operator cabin via the door and the opening, and provides operator access to outside the operator cabin. The door, in the fully open position, can restrict operator access toward a front of the machine and can allow operator access simultaneously to the walkway system and a second operator ingress/egress point.

20 Claims, 4 Drawing Sheets

(56) References Cited

U.S. PATENT DOCUMENTS

2018/0038073 A1\* 2/2018 Wagner ................ E02F 3/7631
2018/0148906 A1\* 5/2018 Magnussen ............... E06C 5/02

\* cited by examiner

INGRESS/EGRESS ARRANGEMENT FOR MACHINE

TECHNICAL FIELD

The present disclosure relates to an ingress/egress arrangement, and more particularly to an ingress/egress arrangement for a machine.

BACKGROUND

Traditional ingress and egress for a machine with a walkway may have a door providing access to an operator cabin that is hinged about a so-called "B-post" of the operator cabin. Such arrangement may require an operator to go around the door while moving on the walkway, for instance, to enter or upon leaving the operator cabin. In such a case, the ingress and egress path may not be considered optimized. Moreover, such arrangement may create a situation where a portion of the ingress and egress path passes through an undesirable (e.g., dangerous) portion of the machine, such as over a track in the case of a dozer as the machine.

U.S. Patent App. Pub. No. 2018/0038073 ("the '073 publication") describes an operator's cab arrangement for a construction machine. According to the '073 publication, the cab arrangement has a door element that is pivotably mounted to a front left post of the cab, and a tread and a hand rail are provided on the same side as the door element. However, the '073 publication does not recite multiple ingress/egress paths relative to the inside of the cab, or side access to the construction machine via the side of the construction machine corresponding to the door element.

SUMMARY OF THE DISCLOSURE

In one aspect, the present disclosure provides an operator ingress/egress arrangement for a construction machine. The operator ingress/egress arrangement can comprise an operator cabin and a walkway system outside the operator cabin. The operator cabin can include a plurality of posts, including first post and a second post, the first post being a front post, and a door rotatably coupled to the first post so as to be movable between at a fully open position and at a fully closed position whereby the door is adjacent to the second post. An opening in the operator cabin between the first post and the second post defines a first operator ingress/egress point, for the operator cabin, where the door closes the opening when the door is in the fully closed position. The walkway system provides operator access to inside the operator cabin via the door and the opening, and provides operator access to outside the operator cabin. The door, in the fully open position, can restrict operator access toward a front of the machine and can allow operator access simultaneously to the walkway system and a second operator ingress/egress point, for the walkway system.

In another aspect of the present disclosure, a side-entry tractor is provided. The side-entry tractor can comprise: a track provided on a first side of the side-entry tractor; an operator cabin; a walkway system outside the operator cabin; and a ladder provided on the first side of the side-entry tractor. The operator cabin can include a plurality of posts, including first post and a second post, the first post being a front post, and a door rotatably coupled to the front post so as to be movable between at a fully open position and at a fully closed position whereby the door is adjacent to the second post, wherein an opening in the operator cabin between the first post and the second post defines a first operator ingress/egress point, for the operator cabin, the door closing the opening when the door is in the fully closed position. The walkway system outside the operator cabin provides operator access to inside the operator cabin via the door and the opening and provides operator access to outside the operator cabin. The ladder is rotatable between at a stowed position and at an access position, the access position being where the ladder provides a second operator ingress/egress point, for the walkway system. The door, in the fully open position, can restrict operator access toward a front of the side-entry tractor and allow operator access simultaneously to the walkway system and the second operator ingress/egress point when the ladder is at the access position. A first path from the first operator ingress/egress point to the second operator ingress/egress point is different from a second path from the first operator ingress/egress point to the walkway system.

In yet another aspect of the present disclosure, a tractor is provided. The tractor can comprise: a track provided on a first side of the tractor; an operator cabin; a multi-tiered walkway system outside the operator cabin; a ladder provided on the first side of the tractor; and a guardrail system that provides protected operator access for the multi-tiered walkway system. The operator cabin can include: a plurality of posts, including a front post and a rearward post, and a door rotatably coupled to the front post so as to be movable between at a fully open position and at a fully closed position whereby the door is adjacent to the rearward post, wherein an opening in the operator cabin between the front post and the rearward post defines a first operator ingress/egress point, for the operator cabin, the door closing the opening when the door is in the fully closed position. The multi-tiered walkway system provides operator access to inside the operator cabin via the door and the opening and provides operator access to outside the operator cabin according to at least two sides of the operator cabin. The multi-tiered walkway system can include: an access platform adjacent to the opening in the operator cabin, the access platform being at a first height of the multi-tiered walkway system, a first multi-use step provided adjacent to the access platform and at a second height of the multi-tiered walkway system above the first height, and a second multi-use step provided adjacent to the first multi-use step and at a third height of the multi-tiered walkway system above the second height, wherein a portion of the access platform, the first multi-use step, and the second multi-use step are provided directly over, in an overhead plan view of the tractor, the first track. The ladder can be movable between at a stowed position and at an access position, the stowed position being where the ladder is horizontally arranged and entirely above the first track in a side elevational view of the tractor, and the access position being where the ladder is vertically arranged in the side elevational view of the tractor and provides a second operator ingress/egress point for the multi-tiered walkway system. The door, in the fully open position, can be part of the guardrail system and restricts operator access toward a front of the tractor and allows operator access simultaneously to the first multi-use step and the second operator ingress/egress point when the ladder is at the access position. A first path from the first operator ingress/egress point to the second operator ingress/egress point is different from a second path from the first operator ingress/egress point to the first multi-use step.

Other features and aspects of this disclosure will be apparent from the following description and the accompanying drawings.

DETAILED DESCRIPTION

Figure 1:
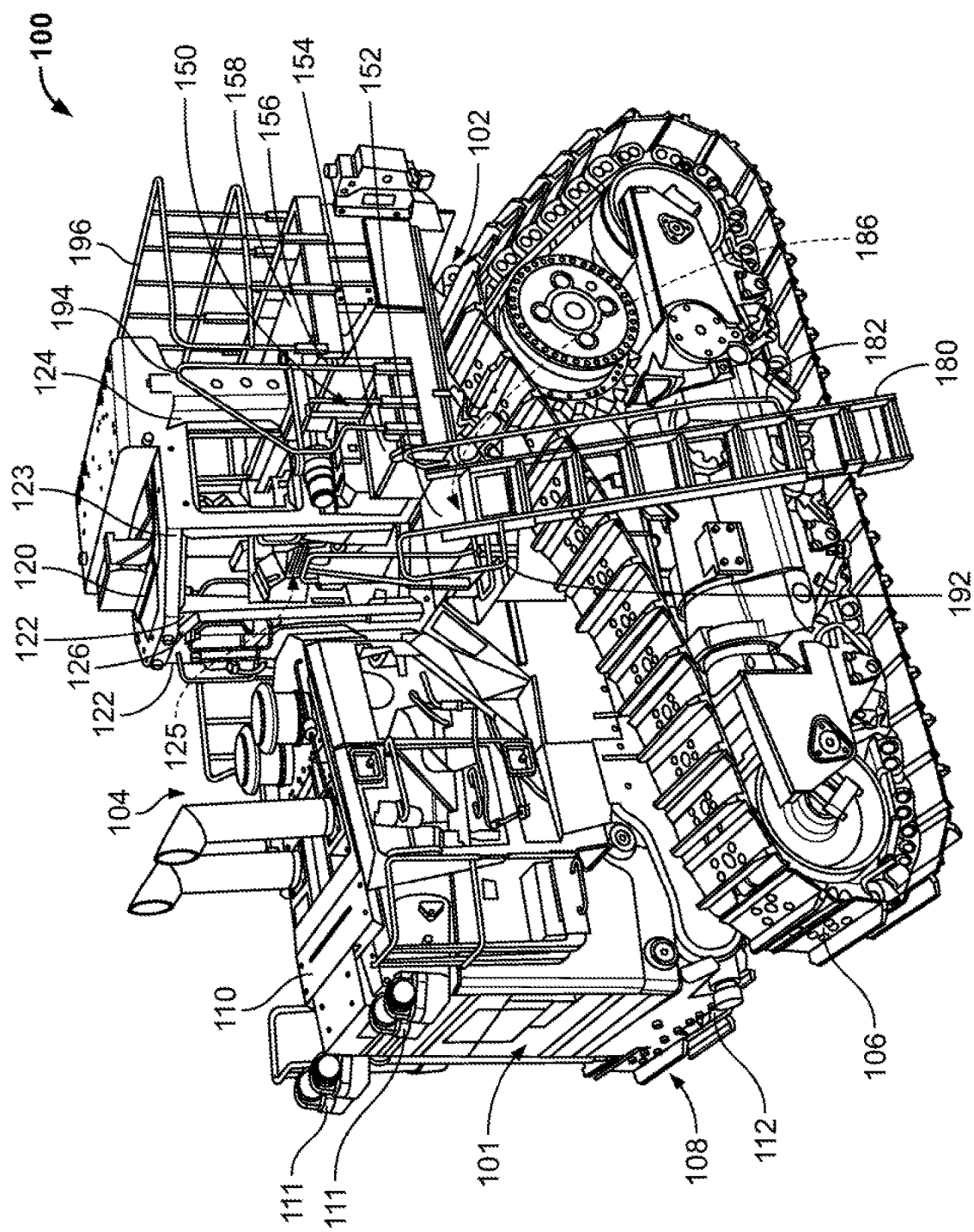
FIG. 1 is a perspective view of an exemplary machine according to one or more embodiments of the present disclosure with an exemplary ingress/egress arrangement according to one or more embodiments of the present disclosure.

The present disclosure relates to an ingress/egress arrangement for a machine. FIG. 1 illustrates a machine 100 in accordance with an embodiment of the present disclosure that implements an ingress/egress arrangement according to an embodiment of the present disclosure. The machine 100 may be a construction or work machine, such as a tractor as shown in FIG. 1. In one or more embodiments the machine 100 in the form of a tractor may be a dozer. Moreover, though FIG. 1 represents that the machine 100 is a track-type tractor having a set of tracks that includes a first track 106 and a second track 108, in one or more embodiments the tracks may be replaced with wheels and tires.

With reference to a front side 101 of machine 100 and a back side of machine 102, the first track 106 may be on a left side of the machine 100 and the second track 108 may be on a right side of the machine 100. As used herein, the left side of the machine 100 may be referred to herein as a "first side" of the machine 100, and the right side of the machine 100 may be referred to herein as a "second side" of the machine.

The machine 100 can be comprised of a body 104 including a frame, a housing 110, an operator cabin 120, and work components, such as an engine, transmission, etc., that is operatively coupled to the first track 106 and the second track 108. Generally, the housing 110 can house various work components of the machine 100. The housing 110 can also include work implement attachments, such as work implement upper attachment section 111 and work implement lower attachment section 112. The work implement attachment sections 111, 112 can couple a work implement, such as a shovel or blade, to the machine 100.

The operator cabin 120 can be comprised of a plurality of posts, including a pair of front posts 122 and a pair of rearward posts 123. Each front post 122 may be referred to as an "A post." Likewise, each rearward post 123 may be referred to herein as a "B post." Moreover, the front post 122 and the rearward post on the left side of the machine 100 may be referred to herein as "first post" and "second post," respectively. The rearward posts 123 are labeled "rearward" because they are positioned to the rear of the front posts 122. Such rearward posts 123 may form the rear-most posts of the operator cabin 120, or, as shown in FIGS. 1-4, the operator cabin 120 may have a pair of rear posts 124 that form rear-most posts.

Adjacent posts of the operator cabin 120 may form respective openings for a window or a door. FIG. 1, for instance, shows an opening 125 between front post 122 and rearward post 123. Discussed in more detail below, the opening 125 may be referred to herein as a first operator ingress/egress point 125. Generally, the first operator ingress/egress point 125 is an access point to and from inside the operator cabin 120.

The operator cabin 120 can also be comprised of a door 126. In the case of FIGS. 1-4, the door 126 is shown on the left side of the machine 100. The door 126 is rotatably coupled, via one or more hinges, for instance, to the front post 122. In this regard, the door is movable (i.e., rotatable) between at a fully open position and at a fully closed position. FIGS. 1-4 show the door at the fully open position. In the fully closed position the door 126 is also adjacent to the rearward post 123. Moreover, in the fully closed position, the door 126 closes the opening 125. In one or more embodiments, such as shown in the overhead plan view of a portion of the machine 100 in FIG. 2, an angle θ of the door at the fully open position relative to the fully closed position can be acute.

Figure 4:
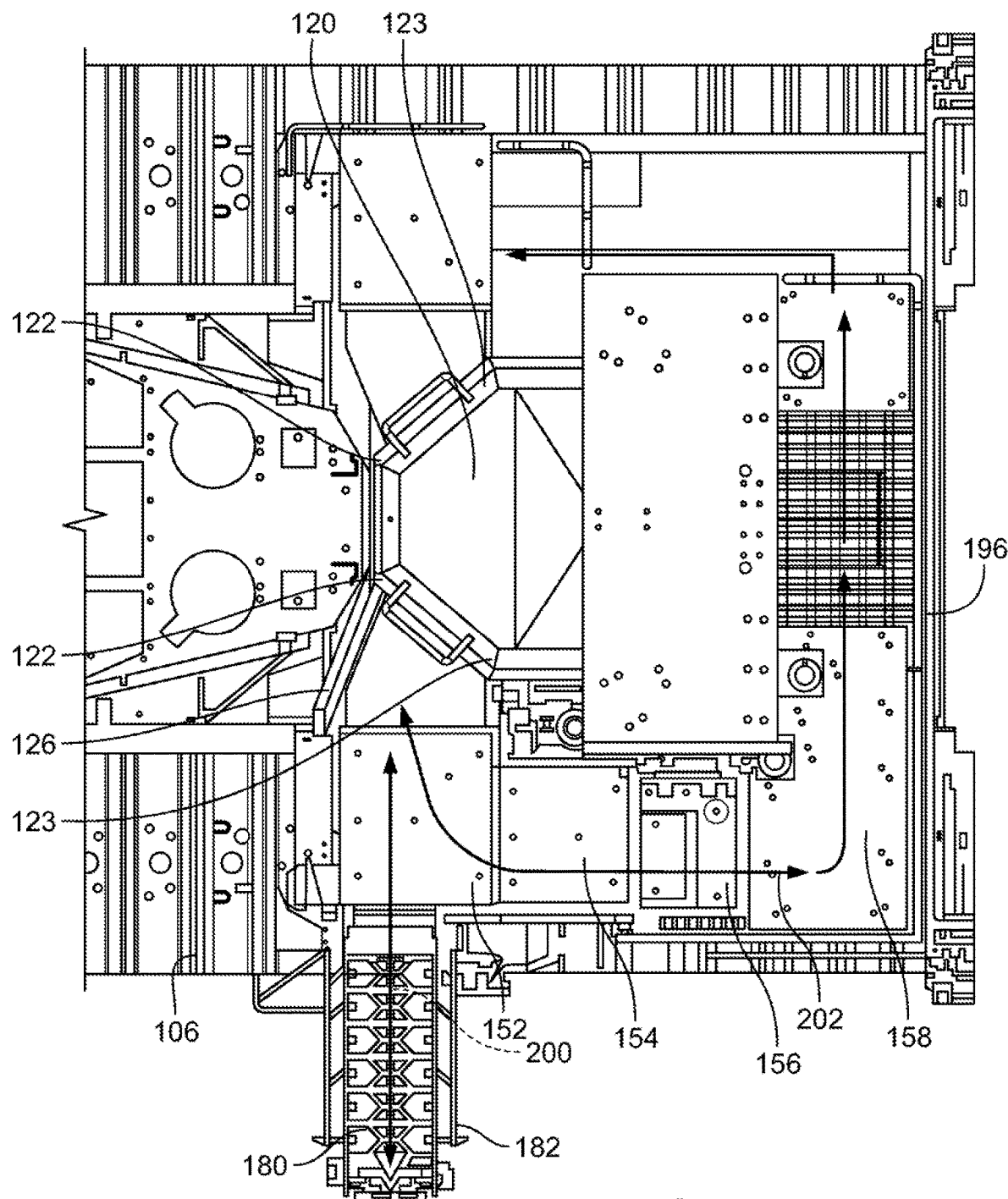
FIG. 4 is an overhead plan view of a portion of the machine of FIG. 1, particularly showing access to an operator cabin of the machine.

The machine 100 can also be comprised of a walkway system 150. The walkway system 150 is provided outside the operator cabin 120 and can provide access to inside the operator cabin 120 via the door 126 and opening 125. The walkway system 150 can also provide access to outside the operator cabin 120. In one or more embodiments, the walkway system 150 provides access to outside the operator cabin 120 according to at least two sides of the operator cabin 120, the left side and the back side. Optionally, as shown in FIG. 4, for instance, the walkway system 150 can provide access to more than two sides of the operator cabin 120. In this regard, FIG. 4 shows an example of the walkway system 150 providing access to outside the operator cabin 120 according to at least 180 degrees, for instance, from the front post 122 on the left side of the machine 100 to the front post 122 on the right side of the machine 100.

The walkway system 150 can include an access platform 152, a first step 154, and a second step 156. Thus, the walkway system 150, according to one or more embodiments, may be comprised of multiple tiers or multi-tier. Discussed in more detail below, the walkway system 150 of FIGS. 1-4 can be a three-tiered walkway system, though embodiments of the disclosed subject matter are not limited to only three tiers and may include more or less than three tiers. Alternatively, according to one or more embodiments, the walkway system 150 may be flat, i.e., at a same height throughout.

The access platform 152 can be provided adjacent to the opening 125 of the operator cabin 120. As shown particularly in FIG. 2, the access platform 152 can have a portion directly adjacent to the opening 125 and a portion directly over the first track 106. The access platform 152 may be at a first height. Such first height may be the same as or substantially the same as the floor of the operator cabin 120, at least upon entry through the door 126 and opening 125. The first step 154 can be provided adjacent to the access platform 152. Moreover, the first step 154 can be at a second height greater than the first height of the access platform 152. The second step 156 can be provided adjacent to the first step 154 such that the first step 154 is between the access platform 152 and the second step 156. The second step 156 can be at a third height greater than the second height of the first step 154. As shown in FIGS. 1-4, a portion of the access platform 152, the first step 154, and the second step 156 can be provided directly over the first track 106 in an overhead plan view of the machine 100.

The second step 156 may lead to a deck 158. The deck 158 may be at the same height as the second step 156, i.e., the third height. Moreover, the deck 158 may span at least the back side of the operator cabin 120. FIG. 4 shows that the deck 158 may span three sides of the operator cabin 120, the back side and at least respective portions of the left side and the right side of the machine 100. In one or more embodiments, the walkway system 150 may consist of the access platform 152, the first step 154, the second step 156, and the deck 158.

Figure 2:
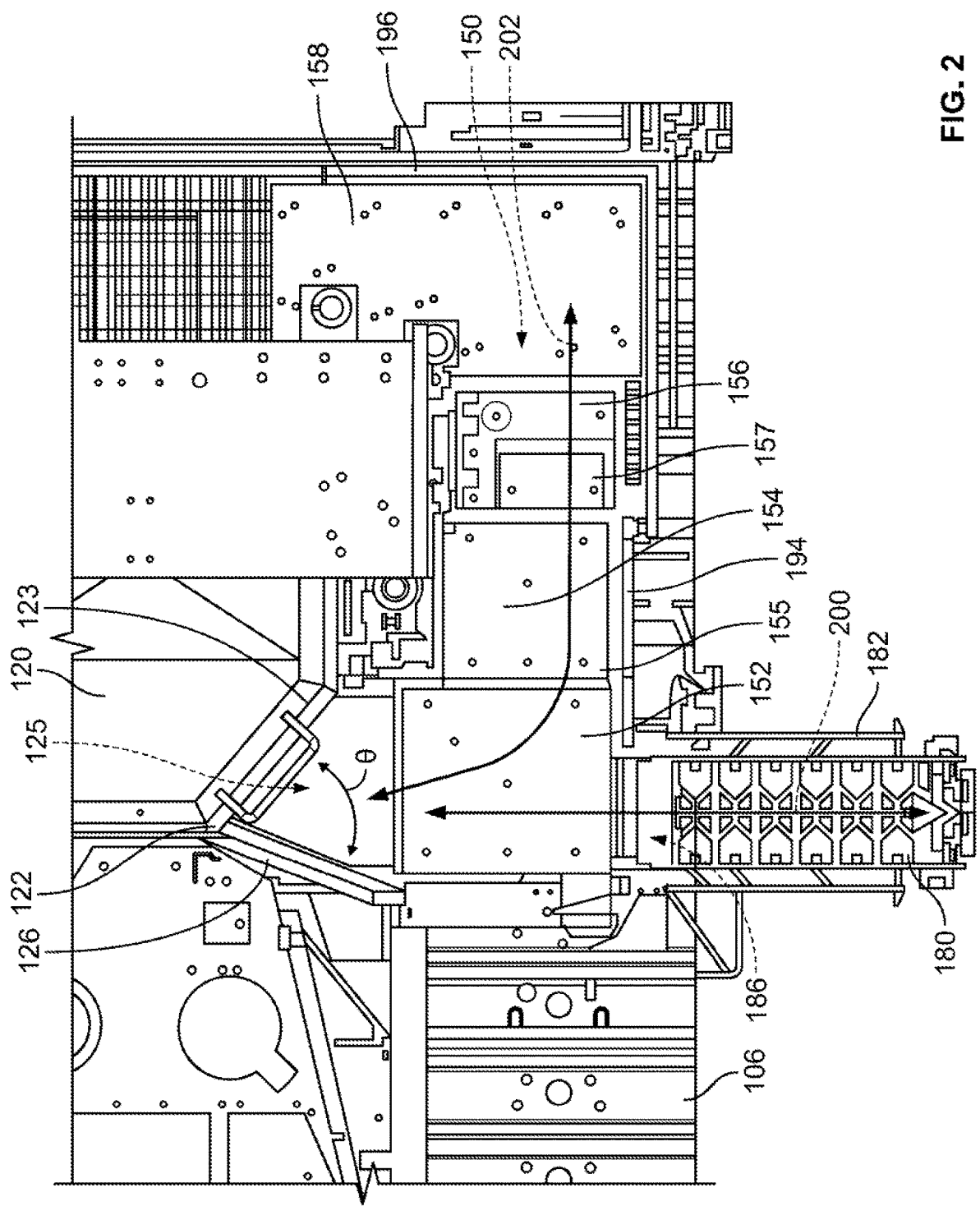
FIG. 2 is an overhead plan view of a portion of the machine of FIG. 1.

The first step 154 may be configured as a first compartment, for instance, to hold one or more batteries for the machine 100. Operator access to the first compartment may be by way of the walkway system 150, particularly the first step 154. For example, access to inside the first compartment may be by way of a first compartment door 155, such as shown in FIG. 2. The first compartment door 155 may take the form of an entire or substantially entire portion of the first step 154, such as shown in FIG. 2. Alternatively, not substantially the entire portion of the first step 154 can form the first compartment door 155. The first compartment door 155 may provide access to inside the first compartment by being completely or partially removable. For instance, in one or more embodiments, the first compartment door 155 may be rotatable or slideably coupled such that the operator can move the first compartment door 155 to gain access to the first compartment. Optionally, the first compartment door 155 may be secured closed, for instance, via a latch arrangement or the like.

The second step 156 may be configured as a second compartment, for instance, to hold one or more filters for the machine 100. Operator access to the second compartment may be by way of the walkway system 150, particularly the second step 156. For example, access to inside the second compartment may be by way of a second compartment door 157, such as shown in FIG. 2. The second compartment door 157 may take the form of not substantially an entire portion of the second step 156, such as shown in FIG. 2. Alternatively, the entire or substantially entire portion of the second step 156 may form the second compartment door 157. The second compartment door 157 may provide access to inside the second compartment by being completely or partially removable. For instance, in one or more embodiments, the second compartment door 157 may be rotatable or slideably coupled such that the operator can move the second compartment door 157 to gain access to the second compartment. Optionally, the second compartment door 157 may be secured closed, for instance, via a ball strap or the like. The first compartment may be referred to herein as a first operator access compartment, and the second compartment may be referred to herein as a second operator access compartment.

The machine 100 can also be comprised of a ladder 180. The ladder 180 may have ladder railing 182 on one or both sides. As shown in FIGS. 1-4, the ladder 180 may be provided on the same side of the machine 100 as the door 126, in the example shown in FIGS. 1-4, the left side of the machine 100. Likewise, the ladder 180 may be provided on the same side of the machine 100 as at least the access platform 152. FIGS. 1-4 also show that the first step 154 and the second step 156 can be provided on the same side of the machine 100 as the ladder 180.

Figure 3:
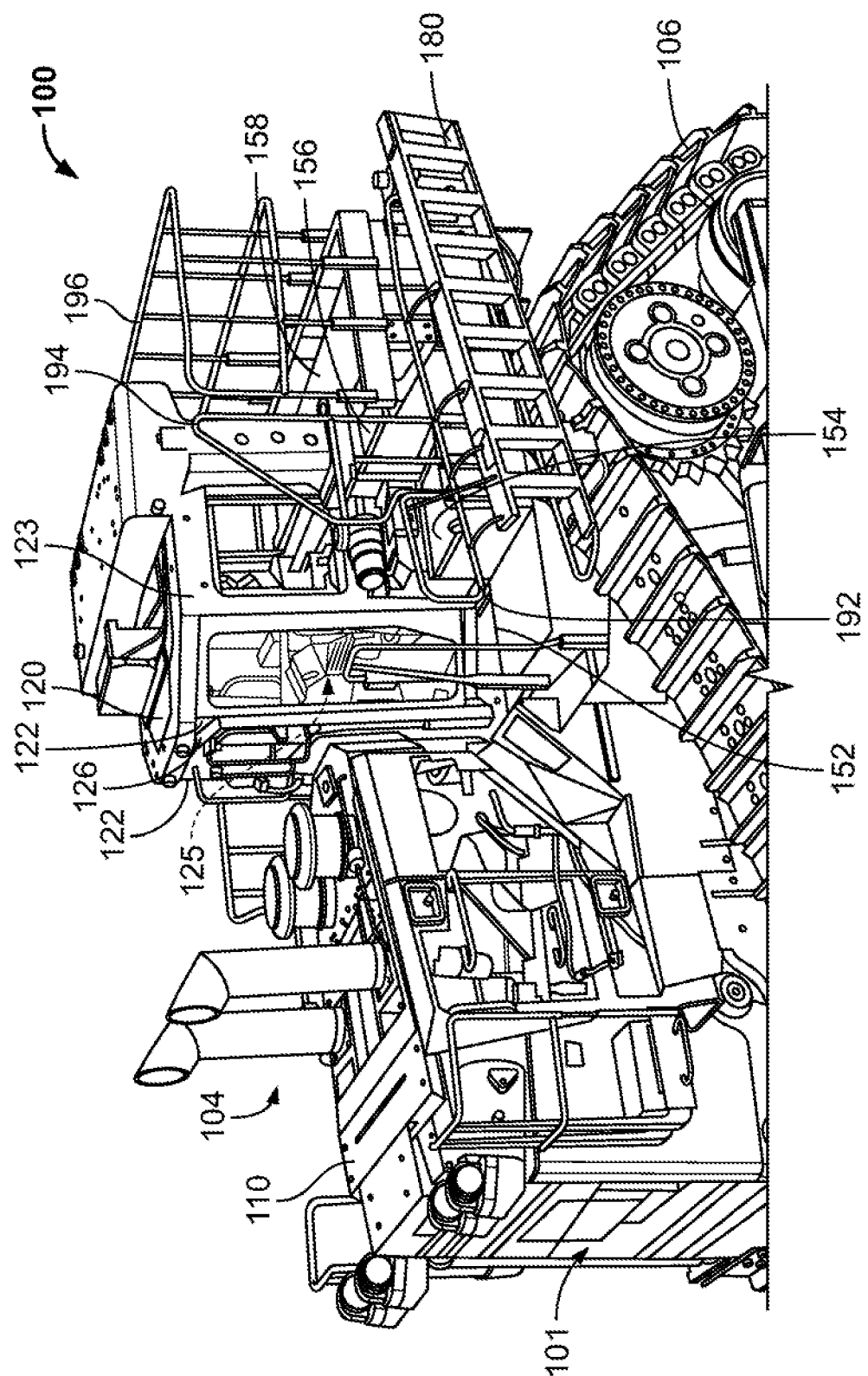
FIG. 3 is a perspective view of the machine of FIG. 1 with a ladder in a stowed position.

The ladder 180 may be movable between at a stowed position and at an access position. For example, the ladder 180 may be rotatable, for instance, via a motor (e.g., hydraulic motor) or manually, from the stowed position to the access position and vice versa. As can be seen from a comparison of FIG. 1 and FIG. 3, the ladder 180 can flip up and over when moving from the access position to the stowed position. Optionally, the ladder 180 may be locked (e.g., pinned) in either position. FIGS. 1, 2, and 4 show the ladder 180 in the access position, whereas FIG. 3 shows the ladder 180 in the stowed position. In the stowed position, the ladder 180 can be horizontally arranged and entirely or partially above the first track 106 in a side elevational view of the machine 100. In the access position, the ladder 180 can be vertically arranged in a side elevational view of the machine 100.

In that the ladder 180 in the access position is provided on the left side of the machine 100 and provides access to the access platform 152, the machine 100 may be termed a so-called "side-entry" machine 100. Moreover, in the access position, the ladder 180 allows an operator to traverse from the bottom of the ladder to the top of the ladder 180 and to the access platform 152 and vice versa, thereby providing ingress and egress for the operator. Thus, the interface between the top of the ladder 180 and the access platform 152 may be referred to or defined herein as a second operator ingress/egress point 186.

The machine 100 can also be comprised of a guard rail system. Generally, the guard rail system can provide protection for the operator as the operator accesses the walkway system 150. The guard rail system may include a step railing 194 and a deck railing 196, which may provide protected operator access for the first step 154 and the second step 156 and the deck 158, respectively.

INDUSTRIAL APPLICABILITY

The present disclosure relates to an ingress/egress arrangement for the machine 100, which may be a so-called side-entry machine. The ingress/egress arrangement can include the door 126 and the walkway system 150. In that the door 126 is rotatable around the left front post 122, also called an "A-post," the door 126, in the fully open position, can allow operator access, without impediment, simultaneously to the first step 154 and the second operator ingress/egress point 186 when the ladder 180 is at the access position, such as shown in FIGS. 2 and 4. Further as shown in FIGS. 2 and 4, a first path 200 between the first operator ingress/egress point 125 to the second operator ingress/egress point 186 is different from a second path 202 between the first operator ingress/egress point 125 to the first step 154 (and beyond).

The walkway system 150, which can provide access to inside and outside the operator cabin 120, can be multi-tiered, for instance, and include the access platform 152, the first step 154, and the second step 156. The first step 154 and/or the second step 156 may be so-called multi-use steps in that the first step 154 and the second step 156 can provide an access path along the walkway system 150 and access to the respective first and second compartments.

The guardrail system of the machine 100 may be reconfigurable according to a plurality of different configurations, for instance, based on whether the ladder 180 is at the stowed position or at the access position and/or based on whether the door 126 is at the fully open position or the fully closed position. For instance, when the ladder 180 is at the stowed position, the guard rail system may also be comprised of platform railing 192, such as shown in FIG. 3. The platform railing 192 may provide protected operator access for the access platform 152. Furthermore, when the ladder 180 is in the stowed position, at least the platform railing 192 may block or negate the second operator ingress/egress point 186.

As another example, the door 126, when in the fully open position, can be considered part of the guardrail system in that it provides protected operator access for the access platform 152. More specifically, the door 126, in the fully open position, may restrict operator access toward the front side 101 of the machine 100, for instance, so the operator cannot or cannot easily move from the access platform 152 to the first track 106.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An operator ingress/egress arrangement for a construction machine comprising:
   an operator cabin including:
      a plurality of posts, including first post and a second post, the first post being a front post, and
      a door rotatably coupled to the first post so as to be movable between at a fully open position and at a fully closed position whereby the door is adjacent to the second post,
      wherein an opening in the operator cabin between the first post and the second post defines a first operator ingress/egress point, for the operator cabin, the door closing the opening when the door is in the fully closed position; and
   a walkway system outside the operator cabin that provides operator access to inside the operator cabin via the door and the opening and that provides operator access to outside the operator cabin,
   wherein the door, in the fully open position, restricts operator access toward a front of the machine and allows operator access simultaneously to the walkway system and a second operator ingress/egress point, for the walkway system.

2. The operator ingress/egress arrangement according to claim 1, further comprising a ladder provided on a same side of the machine as the door, the ladder being movable between at a stowed position and at an access position, the access position being where the ladder provides the second operator ingress/egress point, for the walkway system.

3. The operator ingress/egress arrangement according to claim 1, wherein a first path from the first operator ingress/egress point to the second operator ingress/egress point is different from a second path from the first operator ingress/egress point to the walkway system.

4. The operator ingress/egress arrangement according to claim 1, wherein the walkway system includes:
   an access platform adjacent to the opening in the operator cabin, the access platform being at a first height of the walkway system,
   a first step provided adjacent to the access platform and at a second height of the walkway system above the first height, and
   a second step provided adjacent to the first step and at a third height of the walkway system above the second height.

5. The operator ingress/egress arrangement according to claim 1, wherein the door, in the fully open position, is part of a guardrail system that provides protected operator access for the walkway system.

6. A side-entry tractor comprising:
   a track provided on a first side of the side-entry tractor;
   an operator cabin including:
      a plurality of posts, including first post and a second post, the first post being a front post, and
      a door rotatably coupled to the front post so as to be movable between at a fully open position and at a fully closed position whereby the door is adjacent to the second post,
      wherein an opening in the operator cabin between the first post and the second post defines a first operator ingress/egress point, for the operator cabin, the door closing the opening when the door is in the fully closed position;
   a walkway system outside the operator cabin that provides operator access to inside the operator cabin via the door and the opening and that provides operator access to outside the operator cabin; and
   a ladder provided on the first side of the side-entry tractor, the ladder being rotatable between at a stowed position and at an access position, the access position being where the ladder provides a second operator ingress/egress point, for the walkway system,
   wherein the door, in the fully open position, restricts operator access toward a front of the side-entry tractor and allows operator access simultaneously to the walkway system and the second operator ingress/egress point when the ladder is at the access position, and
   wherein a first path from the first operator ingress/egress point to the second operator ingress/egress point is different from a second path from the first operator ingress/egress point to the walkway system.

7. The side-entry tractor according to claim 6, wherein the walkway system includes:
   an access platform adjacent to the opening in the operator cabin, the access platform being at a first height of the walkway system,
   a first step provided adjacent to the access platform and at a second height of the walkway system above the first height, and
   a second step provided adjacent to the first step and at a third height of the walkway system above the second height,
   wherein a portion of the access platform, the first step, and the second step are provided directly over, in an overhead plan view of the side-entry tractor, the first track, and
   wherein the second path includes from the first operator ingress/egress point to the first step.

8. The side-entry tractor according to claim 7, wherein the second step leads to a deck that spans at least a back side of the operator cabin.

9. The side-entry tractor according to claim 7, wherein the first step is configured as a first operator accessible compartment configured to hold one or more batteries for the side-entry tractor, the first operator accessible compartment being accessible by the operator from the walkway system.

10. The side-entry tractor according to claim 7, wherein the second step is configured as a second operator accessible compartment configured to access one or more filters for the side-entry tractor, the second operator accessible compartment being accessible by the operator from the walkway system.

11. The side-entry tractor according to claim 7, wherein the walkway system is a three-tiered walkway system consisting of the access platform, the first step, the second step, and a deck that spans at least an entire back side of the operator cabin.

12. The side-entry tractor according to claim 6, wherein the door, in the fully open position, is part of a guardrail system that provides protected operator access for the walkway system.

13. The side-entry tractor according to claim 6, wherein an angle of the door at the fully open position relative to the fully closed position is acute.

14. The side-entry tractor according to claim 6, further comprising a guardrail system that provides protected operator access for the walkway system,
wherein the guardrail system is reconfigurable according to a plurality of different configurations based on whether the ladder is at the stowed position or at the access position and/or based on whether the door is at the fully open position or the fully closed position.

15. The side-entry tractor according to claim 6, wherein the walkway system provides operator access to outside the operator cabin according to at least 180 degrees of the operator cabin.

16. A tractor comprising:
a track provided on a first side of the tractor;
an operator cabin including:
a plurality of posts, including a front post and a rearward post, and
a door rotatably coupled to the front post so as to be movable between at a fully open position and at a fully closed position whereby the door is adjacent to the rearward post,
wherein an opening in the operator cabin between the front post and the rearward post defines a first operator ingress/egress point, for the operator cabin, the door closing the opening when the door is in the fully closed position;
a multi-tiered walkway system outside the operator cabin that provides operator access to inside the operator cabin via the door and the opening and that provides operator access to outside the operator cabin according to at least two sides of the operator cabin, the multi-tiered walkway system including:
an access platform adjacent to the opening in the operator cabin, the access platform being at a first height of the multi-tiered walkway system,
a first multi-use step provided adjacent to the access platform and at a second height of the multi-tiered walkway system above the first height, and
a second multi-use step provided adjacent to the first multi-use step and at a third height of the multi-tiered walkway system above the second height,
wherein a portion of the access platform, the first multi-use step, and the second multi-use step are provided directly over, in an overhead plan view of the tractor, the first track;
a ladder provided on the first side of the tractor, the ladder being movable between at a stowed position and at an access position, the stowed position being where the ladder is horizontally arranged and entirely above the first track in a side elevational view of the tractor, and the access position being where the ladder is vertically arranged in the side elevational view of the tractor and provides a second operator ingress/egress point for the multi-tiered walkway system; and
a guardrail system that provides protected operator access for the multi-tiered walkway system,
wherein the door, in the fully open position, is part of the guardrail system and restricts operator access toward a front of the tractor and allows operator access simultaneously to the first multi-use step and the second operator ingress/egress point when the ladder is at the access position, and
wherein a first path from the first operator ingress/egress point to the second operator ingress/egress point is different from a second path from the first operator ingress/egress point to the first multi-use step.

17. The tractor according to claim 16, wherein the second multi-use step leads to a deck that spans at least a back side of the operator cabin.

18. The tractor according to claim 16,
wherein the first multi-use step is configured as a first operator accessible compartment configured to hold one or more batteries for the tractor, the first operator accessible compartment being accessible by the operator from the multi-tiered walkway system, and
wherein the second multi-use step is configured as a second operator accessible compartment configured to access one or more filters for the tractor, the second operator accessible compartment being accessible by the operator from the multi-tiered walkway system.

19. The tractor according to claim 16, wherein an angle of the door in the fully open position relative to the fully closed position is acute.

20. The tractor according to claim 16, wherein the multi-tiered walkway system is a three-tiered walkway system consisting of the access platform, the first multi-use step, the second multi-use step, and a deck that spans at least an entire back side of the operator cabin.

* * * * *